United States Patent
Shveidel et al.

(10) Patent No.: US 10,048,874 B1
(45) Date of Patent: Aug. 14, 2018

(54) FLOW CONTROL WITH A DYNAMIC WINDOW IN A STORAGE SYSTEM WITH LATENCY GUARANTEES

(71) Applicant: EMC Corporation, Hopkinton, MA (US)

(72) Inventors: Vladimir Shveidel, Pardas-Hana (IL); Kirill Shoikhet, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 87 days.

(21) Appl. No.: 15/196,447

(22) Filed: Jun. 29, 2016

(51) Int. Cl.
G06F 12/00 (2006.01)
G06F 13/00 (2006.01)
(Continued)

(52) U.S. Cl.
CPC .......... G06F 3/0611 (2013.01); G06F 3/067 (2013.01); G06F 3/0653 (2013.01)

(58) Field of Classification Search
CPC ....... G06F 3/06–3/061; G06F 3/0611–3/0652; G06F 3/0653; G06F 3/0655–3/067; G06F 3/0671–3/0689; G06F 9/00–9/548; G06F 11/00–11/3696; G06F 13/00–13/4295; G06F 15/00–15/825; G06F 17/00–17/30997; G06F 2206/00–2206/20; G06F 2212/00–2212/7211; H04L 12/00–12/66; H04L 2012/284–2012/285; H04L 2012/40208–2012/40293; H04L 2012/5603–2012/5687; H04L 2012/6405–2012/6416; H04L 2012/6421–2012/6497;
(Continued)

(56) References Cited

U.S. PATENT DOCUMENTS

| 4,164,763 A | 8/1979 | Briccetti et al. |
| 4,608,839 A | 9/1986 | Tibbals, Jr. |

(Continued)

FOREIGN PATENT DOCUMENTS

| EP | 1804157 | 7/2007 |
| WO | WO 2010/019596 | 2/2010 |

(Continued)

OTHER PUBLICATIONS eMuse: QoS Guarantees for Shared Storage Servers; Feng et al.; 22nd International Conference on Advanced Information Networking and Applications; Mar. 25-28, 2008; pp. 264-269 (Year: 2008).*
(Continued)

*Primary Examiner* — Daniel C Chappell
(74) *Attorney, Agent, or Firm* — Daly, Crowley Mofford & Durkee, LLP

(57) ABSTRACT

Described embodiments may provide methods and systems for receiving one or more input/output (I/O) requests by a storage system having at least one storage cluster. The storage system performs each I/O request with dynamic flow control by determining a latency associated with the one or more received I/O requests during at least one monitoring interval and tracking I/O requests to the storage cluster. If a received I/O request exceeds a choker threshold value of the storage cluster, the I/O request is queued. Otherwise, the received I/O request is performed for the storage cluster.

11 Claims, 9 Drawing Sheets

(51) Int. Cl.
*G06F 13/28* (2006.01)
*G06F 3/06* (2006.01)

(58) Field of Classification Search
CPC ....... H04L 29/00–29/14; H04L 47/00–47/829; H04L 65/00–65/80; H04W 28/00–28/26
See application file for complete search history.

(56) References Cited

U.S. PATENT DOCUMENTS

| | | | |
|---|---|---|---|
| 4,821,178 A | 4/1989 | Levin et al. | |
| 5,319,645 A | 6/1994 | Bassi et al. | |
| 5,537,534 A | 7/1996 | Voigt et al. | |
| 5,539,907 A | 7/1996 | Srivastava et al. | |
| 5,627,995 A | 5/1997 | Miller | |
| 5,710,724 A | 1/1998 | Burrows | |
| 5,732,273 A | 3/1998 | Srivastava et al. | |
| 5,860,137 A * | 1/1999 | Raz | G06F 9/5083 707/E17.032 |
| 5,896,538 A | 4/1999 | Blandy et al. | |
| 5,903,730 A | 5/1999 | Asai et al. | |
| 5,940,618 A | 8/1999 | Blandy et al. | |
| 5,987,250 A | 11/1999 | Subrahmanyam | |
| 5,999,842 A | 12/1999 | Harrison et al. | |
| 6,173,217 B1 * | 1/2001 | Bogin | G06F 1/206 700/153 |
| 6,182,086 B1 | 1/2001 | Lomet et al. | |
| 6,226,787 B1 | 5/2001 | Serra et al. | |
| 6,327,699 B1 | 12/2001 | Larus et al. | |
| 6,353,805 B1 | 3/2002 | Zahir et al. | |
| 6,470,238 B1 * | 10/2002 | Nizar | G06F 13/1668 700/153 |
| 6,470,478 B1 | 10/2002 | Bargh et al. | |
| 6,519,766 B1 | 2/2003 | Barritz et al. | |
| 6,643,654 B1 | 11/2003 | Patel et al. | |
| 6,654,948 B1 | 11/2003 | Konuru et al. | |
| 6,658,471 B1 | 12/2003 | Berry et al. | |
| 6,658,654 B1 | 12/2003 | Berry et al. | |
| 6,801,914 B2 | 10/2004 | Barga et al. | |
| 6,820,218 B1 | 11/2004 | Barga et al. | |
| 6,870,929 B1 | 3/2005 | Greene | |
| 6,892,312 B1 * | 5/2005 | Johnson | G06F 1/206 713/320 |
| 7,058,665 B1 * | 6/2006 | Lang | G06F 3/0619 |
| 7,099,797 B1 | 8/2006 | Richard | |
| 7,143,410 B1 | 11/2006 | Coffman et al. | |
| 7,251,663 B1 | 7/2007 | Smith | |
| 7,315,795 B2 | 1/2008 | Homma | |
| 7,389,497 B1 | 6/2008 | Edmark et al. | |
| 7,421,681 B2 | 9/2008 | DeWitt, Jr. et al. | |
| 7,552,125 B1 | 6/2009 | Evans | |
| 7,574,587 B2 | 8/2009 | DeWitt, Jr. et al. | |
| 7,693,999 B2 | 4/2010 | Park | |
| 7,714,747 B2 | 5/2010 | Fallon | |
| 7,814,218 B1 | 10/2010 | Knee et al. | |
| 7,827,136 B1 | 11/2010 | Wang et al. | |
| 7,908,436 B1 | 3/2011 | Srinivasan et al. | |
| 8,019,939 B2 * | 9/2011 | Jutzi | G06F 12/0888 711/113 |
| 8,200,923 B1 | 6/2012 | Healey et al. | |
| 8,250,257 B1 * | 8/2012 | Harel | G06F 3/061 710/38 |
| 8,335,899 B1 | 12/2012 | Meiri et al. | |
| 8,468,251 B1 * | 6/2013 | Pijewski | G06F 9/5072 709/215 |
| 8,478,951 B1 | 7/2013 | Healey et al. | |
| 8,782,224 B2 * | 7/2014 | Pijewski | G06F 9/5083 709/203 |
| 9,037,822 B1 * | 5/2015 | Meiri | G06F 3/065 711/162 |
| 9,104,326 B2 | 8/2015 | Frank et al. | |
| 9,128,942 B1 | 9/2015 | Pfau et al. | |
| 9,208,162 B1 | 12/2015 | Hallak et al. | |
| 9,304,889 B1 * | 4/2016 | Chen | G06F 11/3452 |
| 9,330,048 B1 * | 5/2016 | Bhatnagar | G06F 13/1642 |
| 9,411,623 B1 * | 8/2016 | Ryan | G06F 9/45558 |
| 9,537,777 B1 * | 1/2017 | Tohmaz | H04L 47/20 |
| 9,762,460 B2 | 9/2017 | Pawlowski et al. | |
| 9,769,254 B2 | 9/2017 | Gilbert et al. | |
| 9,785,468 B2 | 10/2017 | Mitchell et al. | |
| 2002/0056031 A1 | 5/2002 | Skiba et al. | |
| 2002/0133512 A1 | 9/2002 | Milillo et al. | |
| 2003/0023656 A1 | 1/2003 | Hutchison et al. | |
| 2003/0028616 A1 * | 2/2003 | Aoki | H04L 47/10 709/217 |
| 2003/0079041 A1 | 4/2003 | Parrella, Sr. et al. | |
| 2003/0145251 A1 | 7/2003 | Cantrill | |
| 2004/0030721 A1 | 2/2004 | Kruger et al. | |
| 2004/0230742 A1 * | 11/2004 | Ikeuchi | G06F 3/061 711/112 |
| 2004/0267835 A1 | 12/2004 | Zwilling et al. | |
| 2005/0039171 A1 | 2/2005 | Avakian et al. | |
| 2005/0102547 A1 | 5/2005 | Keeton et al. | |
| 2005/0125626 A1 | 6/2005 | Todd | |
| 2005/0144416 A1 | 6/2005 | Lin | |
| 2005/0171937 A1 | 8/2005 | Hughes et al. | |
| 2005/0177603 A1 | 8/2005 | Shavit | |
| 2005/0193084 A1 * | 9/2005 | Todd | G06F 3/0607 709/214 |
| 2006/0031653 A1 | 2/2006 | Todd et al. | |
| 2006/0031787 A1 | 2/2006 | Ananth et al. | |
| 2006/0047776 A1 | 3/2006 | Chieng et al. | |
| 2006/0070076 A1 | 3/2006 | Ma | |
| 2006/0123212 A1 | 6/2006 | Yagawa | |
| 2006/0179195 A1 * | 8/2006 | Sharma | G06F 9/5077 710/123 |
| 2006/0242442 A1 | 10/2006 | Armstrong et al. | |
| 2007/0078982 A1 | 4/2007 | Aidun et al. | |
| 2007/0208788 A1 | 9/2007 | Chakravarty et al. | |
| 2007/0297434 A1 * | 12/2007 | Arndt | H04L 41/0659 370/412 |
| 2008/0098183 A1 | 4/2008 | Morishita et al. | |
| 2008/0163215 A1 | 7/2008 | Jiang et al. | |
| 2008/0178050 A1 | 7/2008 | Kern et al. | |
| 2008/0243952 A1 | 10/2008 | Webman et al. | |
| 2008/0288739 A1 * | 11/2008 | Bamba | G06F 9/5016 711/172 |
| 2009/0006745 A1 | 1/2009 | Cavallo et al. | |
| 2009/0030986 A1 | 1/2009 | Bates | |
| 2009/0049450 A1 * | 2/2009 | Dunshea | G06F 9/5083 718/105 |
| 2009/0055613 A1 | 2/2009 | Maki et al. | |
| 2009/0089458 A1 * | 4/2009 | Sugimoto | G06F 3/0613 710/6 |
| 2009/0089483 A1 | 4/2009 | Tanaka et al. | |
| 2009/0100108 A1 | 4/2009 | Chen et al. | |
| 2009/0222596 A1 | 9/2009 | Flynn et al. | |
| 2009/0319996 A1 | 12/2009 | Shafi et al. | |
| 2010/0042790 A1 | 2/2010 | Mondal et al. | |
| 2010/0088296 A1 | 4/2010 | Periyagaram et al. | |
| 2010/0180145 A1 | 7/2010 | Chu | |
| 2010/0199066 A1 | 8/2010 | Artan et al. | |
| 2010/0205330 A1 | 8/2010 | Noborikawa et al. | |
| 2010/0223619 A1 | 9/2010 | Jaquet et al. | |
| 2010/0257149 A1 | 10/2010 | Cognigni et al. | |
| 2011/0040903 A1 * | 2/2011 | Sterns | G06F 3/0607 710/39 |
| 2011/0060722 A1 | 3/2011 | Li et al. | |
| 2011/0078494 A1 | 3/2011 | Maki et al. | |
| 2011/0083026 A1 | 4/2011 | Mikami et al. | |
| 2011/0099342 A1 | 4/2011 | Ozdemir | |
| 2011/0119679 A1 * | 5/2011 | Muppirala | G06F 3/0611 718/105 |
| 2011/0161297 A1 | 6/2011 | Parab | |
| 2011/0225122 A1 | 9/2011 | Denuit et al. | |
| 2011/0289291 A1 | 11/2011 | Agombar et al. | |
| 2012/0054472 A1 | 3/2012 | Altman et al. | |
| 2012/0059799 A1 | 3/2012 | Oliveira et al. | |
| 2012/0078852 A1 | 3/2012 | Haselton et al. | |
| 2012/0124282 A1 | 5/2012 | Frank et al. | |
| 2012/0278793 A1 | 11/2012 | Jalan et al. | |
| 2012/0290546 A1 | 11/2012 | Smith et al. | |
| 2012/0290798 A1 | 11/2012 | Huang et al. | |

(56) References Cited

U.S. PATENT DOCUMENTS

| | | | |
|---|---|---|---|
| 2012/0304024 | A1 | 11/2012 | Rohleder et al. |
| 2013/0031077 | A1 | 1/2013 | Liu et al. |
| 2013/0073527 | A1 | 3/2013 | Bromley |
| 2013/0111007 | A1 | 5/2013 | Hoffmann et al. |
| 2013/0138607 | A1 | 5/2013 | Bashyam et al. |
| 2013/0151683 | A1 | 6/2013 | Jain et al. |
| 2013/0151759 | A1 | 6/2013 | Shim et al. |
| 2013/0246354 | A1 | 9/2013 | Clayton et al. |
| 2013/0246724 | A1 | 9/2013 | Furuya |
| 2013/0265883 | A1 | 10/2013 | Henry et al. |
| 2013/0282997 | A1 | 10/2013 | Suzuki et al. |
| 2013/0332610 | A1 | 12/2013 | Beveridge |
| 2013/0339533 | A1 | 12/2013 | Neerincx et al. |
| 2014/0032964 | A1 | 1/2014 | Neerincx et al. |
| 2014/0040199 | A1 | 2/2014 | Golab et al. |
| 2014/0040343 | A1 | 2/2014 | Nickolov et al. |
| 2014/0108759 | A1* | 4/2014 | Iwamitsu ............ G06F 3/0604 711/165 |
| 2014/0136759 | A1 | 5/2014 | Sprouse et al. |
| 2014/0161348 | A1 | 6/2014 | Sutherland et al. |
| 2014/0195484 | A1 | 7/2014 | Wang et al. |
| 2014/0237201 | A1 | 8/2014 | Swift |
| 2014/0297588 | A1 | 10/2014 | Babashetty et al. |
| 2014/0359231 | A1 | 12/2014 | Matthews |
| 2014/0380282 | A1 | 12/2014 | Ravindranath Sivalingam et al. |
| 2015/0006910 | A1 | 1/2015 | Shapiro |
| 2015/0088823 | A1 | 3/2015 | Chen et al. |
| 2015/0089135 | A1* | 3/2015 | Iizawa .................. G06F 3/061 711/114 |
| 2015/0112933 | A1 | 4/2015 | Satapathy |
| 2015/0121020 | A1* | 4/2015 | Bita .................... G06F 3/0613 711/158 |
| 2015/0149739 | A1 | 5/2015 | Seo et al. |
| 2015/0205816 | A1 | 7/2015 | Periyagaram et al. |
| 2015/0249615 | A1 | 9/2015 | Chen et al. |
| 2015/0324236 | A1 | 11/2015 | Gopalan et al. |
| 2016/0042285 | A1 | 2/2016 | Gilenson et al. |
| 2016/0062853 | A1 | 3/2016 | Sugabrahmam et al. |
| 2016/0077745 | A1* | 3/2016 | Patel .................. G06F 3/0608 714/704 |
| 2016/0080482 | A1 | 3/2016 | Gilbert et al. |
| 2016/0188419 | A1 | 6/2016 | Dagar et al. |
| 2016/0350391 | A1 | 12/2016 | Vijayan et al. |
| 2016/0359968 | A1 | 12/2016 | Chitti et al. |
| 2016/0366206 | A1 | 12/2016 | Shemer et al. |
| 2017/0123704 | A1 | 5/2017 | Sharma et al. |
| 2017/0139786 | A1 | 5/2017 | Simon et al. |
| 2017/0161348 | A1 | 6/2017 | Araki et al. |
| 2017/0235503 | A1* | 8/2017 | Karr .................... G06F 3/0619 711/114 |
| 2017/0235673 | A1* | 8/2017 | Patel .................. G06F 12/0253 711/159 |

FOREIGN PATENT DOCUMENTS

| | | |
|---|---|---|
| WO | WO 2010/040078 | 4/2010 |
| WO | WO 2012/088528 | 5/2012 |

OTHER PUBLICATIONS

Improving I/O performance with a conditional store buffer; Schaelicke et al.; 31st Annual ACM/IEEE International Symposium on Microarchitecture; Dec. 2, 1998 (Year: 1998).*
Buffering and Flow Control in Optical Switches for High Performance Computing; Ye et al.; IEEE/OSA Journal of Optical Communications and Networking, vol. 3., iss. 8; Aug. 2011 (Year: 2011).*
Storage performance virtualization via throughput and latency control; Zhang et al.; 13th IEEE International Symposium on Modeling, Analysis, and Simulation of Computer and Telecommunication Systems; Sep. 27-29, 2005 (Year: 2005).*
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/085,168, filed Mar. 30, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
U.S. Appl. No. 15/196,674, filed Jun. 29, 2016, Kleiner et al.
U.S. Appl. No. 15/196,427, filed Jun. 29, 2016, Shveidel.
U.S. Appl. No. 15/196,374, filed Jun. 29, 2016, Shveidel et al.
U.S. Appl. No. 15/196,472, filed Jun. 29, 2016, Shveidel.
PCT International Search Report and Written Opinion dated Dec. 1, 2011 for PCT Application No. PCT/IL2011/000692; 11 Pages.
PCT International Preliminary Report dated May 30, 2013 for PCT Patent Application No. PCT/IL2011/000692; 7 Pages.
U.S. Appl. No. 12/945,915; 200 Pages.
U.S. Appl. No. 12/945,915; 108 Pages.
U.S. Appl. No. 12/945,915; 67 Pages.
Nguyen et al., "B+ Hash Tree: Optimizing Query Execution Times for on- Disk Semantic Web Data Structures:" Proceedings of the 6th International Workshop on Scalable Semantic Web Knowledge Base Systems; Shanghai, China, Nov. 8, 2010 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,961; 28 Pages.
Response to Office Action dated Jul. 22, 2015 corresponding to U.S. Appl. No. 14/034,981; Response filed Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed Jan. 14, 2018; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405;Response filed Oct. 6, 2015; 1 Pages.
Office Action dated Dec. 1, 2015 corresponding to U.S. Appl. No. 14/230,405: 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899; 19 Pages
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
Response filed on May 2, 2016 to the Non-Final Office Action dated Dec. 1, 2015; for U.S. Appl. No. 14/230,405; 8 pages.
Response filed on May 2, 2016 to the Non-Final Office Action dated Feb. 4, 2016; for U.S. Appl. No. 14/037,577; 10 pages.
U.S. Non-Final Office Action dated Dec. 1, 2017 for U.S. Appl. No. 14/979,890; 10 Pages.
U.S. Non-Final Office Action dated Dec. 14, 2017 for U.S. Appl. No. 15/076,946; 28 Pages.
U.S. Notice of Allowance dated Jan. 26, 2018 corresponding to U.S. Appl. No. 15/085,172; 8 Pages
U.S. Notice of Allowance dated Jan. 24, 2018 corresponding to U.S. Appl. No. 15/085,181; 8 Pages.

(56) References Cited

OTHER PUBLICATIONS

Response to U.S. Non-Final Office Action dated Nov. 1, 2017 corresponding to U.S. Appl. No. 15/196,374; Response filed Jan. 30, 2018; 14 Pages
U.S. Notice of Allowance dated Feb. 21, 2018 corresponding to U.S. Appl. No. 15/196,427; 31 Pages.
Office Action dated Nov. 1, 2017 corresponding to U.S. Appl. No. 15/196,374, 64 Pages.
Response to U.S. Non-Final Office Action dated Dec. 14, 2017 for U.S. Appl. No. 15/076,946; Response filed Mar. 14, 2018; 11 pages.
U.S. Non-Final Office Action dated Jan. 11, 2018 corresponding to U.S. Appl. No. 15/085,168; 14 pages
U.S. Non-Final Office Action dated Dec. 29, 2017 corresponding to U.S. Appl. No. 15/196,674; 34 pages.
U.S. Non-Final Office Action dated Jan. 8, 2018 corresponding to U.S. Appl. No. 15/196,472; 16 pages.

\* cited by examiner

FLOW CONTROL WITH A DYNAMIC WINDOW IN A STORAGE SYSTEM WITH LATENCY GUARANTEES

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect may provide a method for receiving one or more input/output (I/O) requests by a storage system having at least one storage cluster. The storage system performs each I/O request with dynamic flow control by determining a latency associated with the one or more received I/O requests during at least one monitoring interval and tracking I/O requests to the storage cluster. If a received I/O request exceeds a choker threshold value of the storage cluster, the I/O request is queued. Otherwise, the received I/O request is performed for the storage cluster.

Another aspect may provide a system including a processor and a memory storing computer program code that when executed on the processor causes the processor to execute an input/output (I/O) request received by a storage system having at least one storage cluster. The system performs each I/O request with dynamic flow control by determining a latency associated with the one or more received I/O requests during at least one monitoring interval and tracking I/O requests to the storage cluster. If a received I/O request exceeds a choker threshold value of the storage cluster, the I/O request is queued. Otherwise, the received I/O request is performed for the storage cluster.

Another aspect may provide a computer program product including a non-transitory computer readable storage medium having computer program code encoded thereon that when executed on a processor of a computer causes the computer to execute an input/output (I/O) request received by a storage system having at least one storage cluster. The computer program product includes computer program code for receiving one or more input/output (I/O) requests. The computer program product includes computer program code for performing each I/O request with dynamic flow control by determining a latency associated with the one or more received I/O requests during at least one monitoring interval and tracking I/O requests to the storage cluster. If a received I/O request exceeds a choker threshold value of the storage cluster, the I/O request is queued. Otherwise, the received I/O request is performed for the storage cluster.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
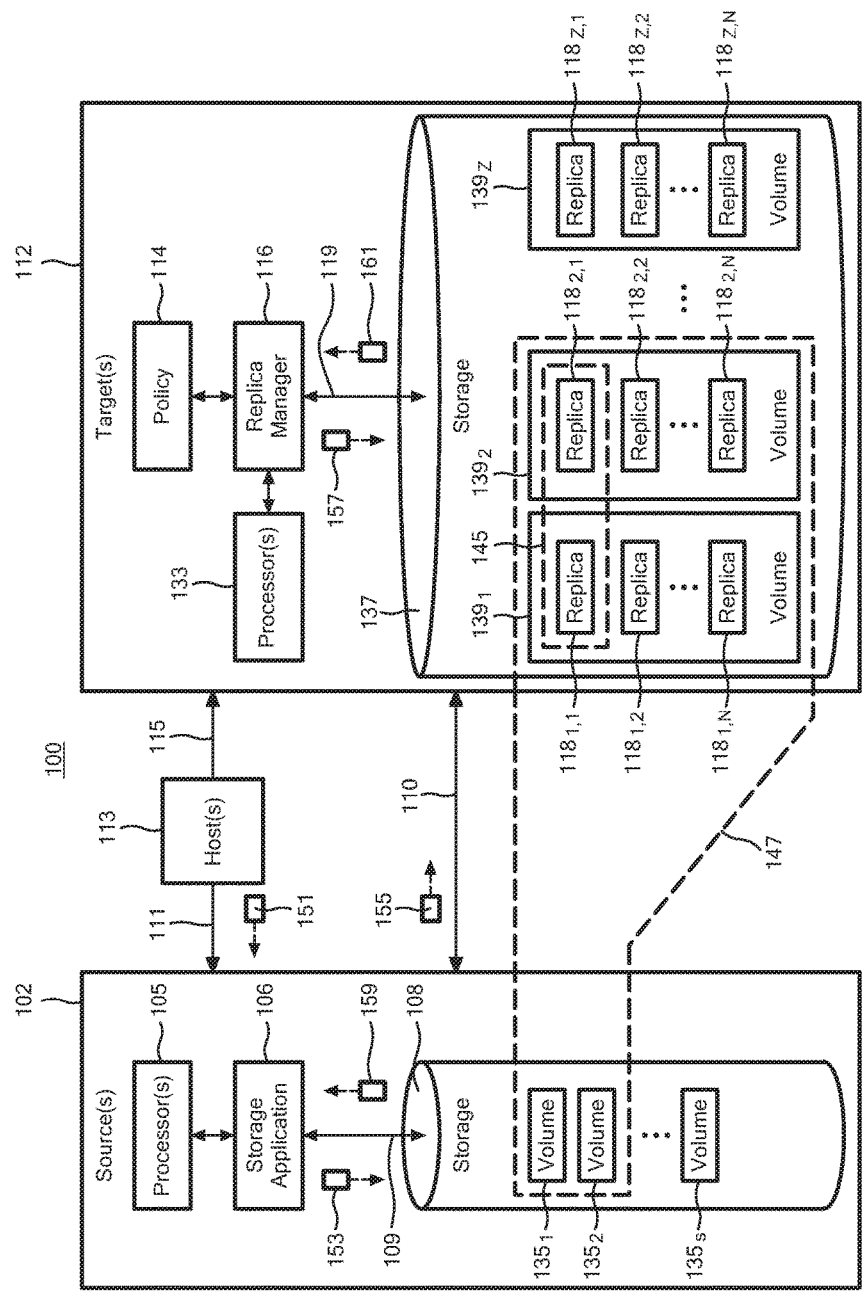
FIG. 1 is a block diagram of an example of a storage system in accordance with an illustrative embodiment.

FIG. 1 shows an example storage system 100 that may perform reactive flow control with a dynamic window to provide guaranteed maximum latency for input/output (I/O) operations of storage system 100, in accordance with illustrative embodiments.

Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-Z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
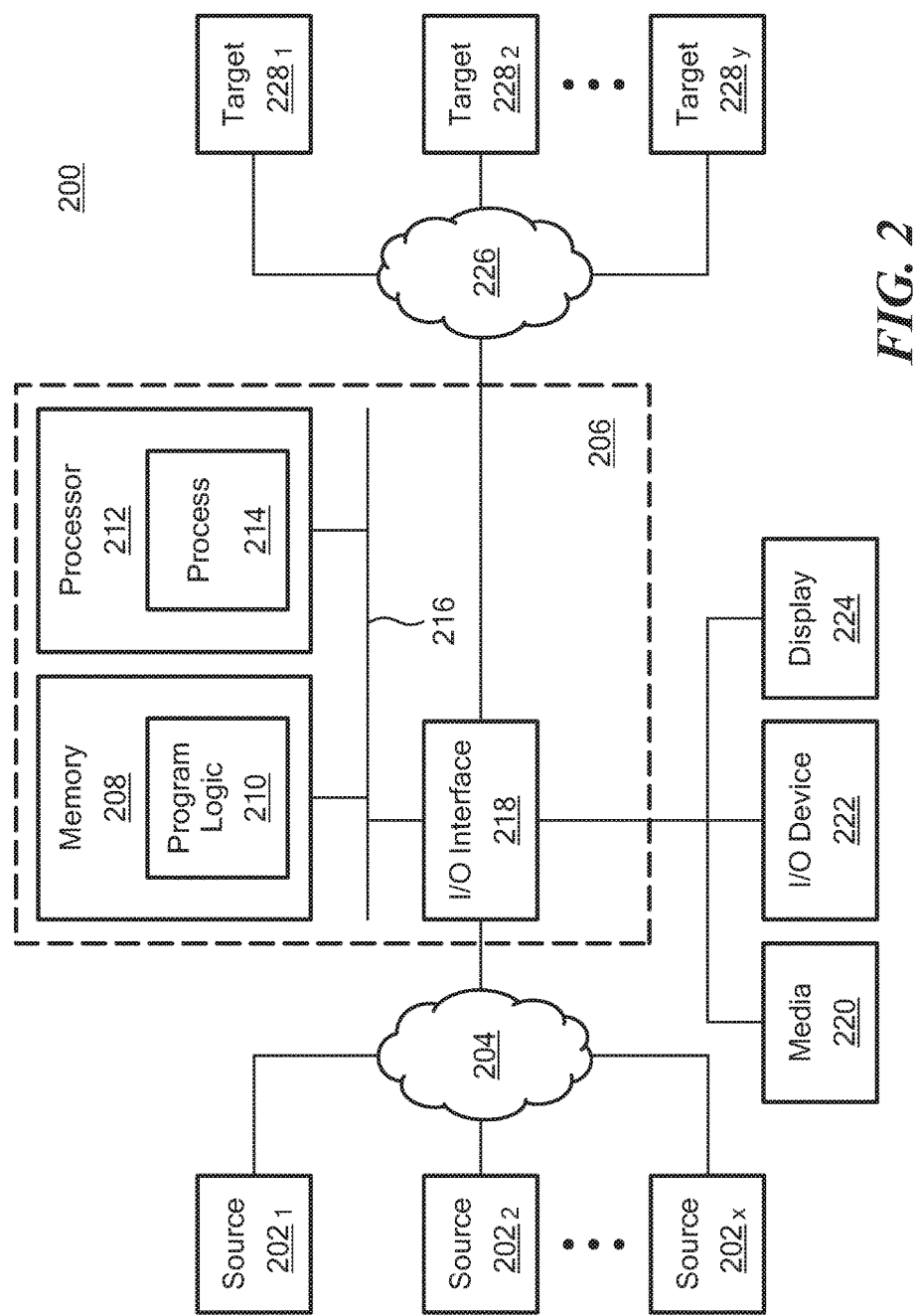
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
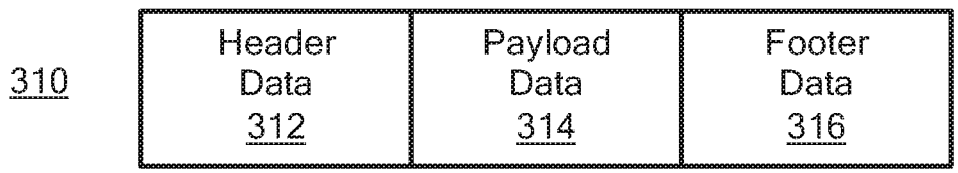
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Figure 3B:
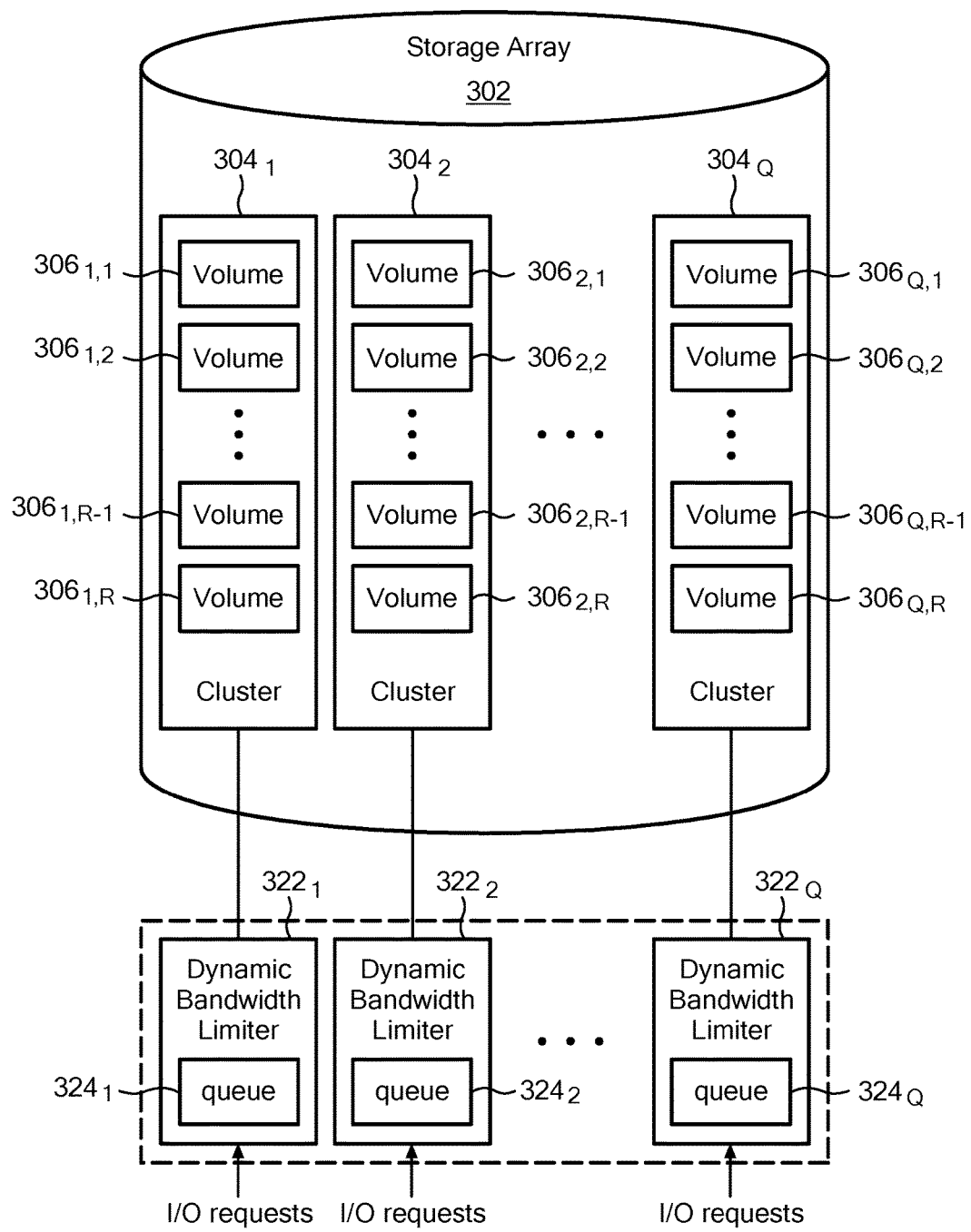
FIG. 3B is a block diagram of an example storage array of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. Clusters 304 may include the same number of storage volumes or different numbers of storage volumes. For example, clusters 304 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Described embodiments provide flow control to clusters 304. Illustrative embodiments may include one or more dynamic bandwidth limiters $322_1$-$322_Q$, each associated with a given one of clusters $304_1$-$304_Q$. Each one of dynamic bandwidth limiters $322_1$-$322_Q$ (generally referred to as dynamic bandwidth limiters 322) may include an associated I/O request queue, shown as queues $324_1$-$324_Q$ (generally referred to as queues 324). Although shown as employing a separate dynamic bandwidth limiter 322 for each one of clusters 304, other embodiments may employ other numbers of dynamic bandwidth limiters, for example, a single dynamic bandwidth limiter for multiple ones of clusters 304, as indicated by dashed line 320. In some embodiments, dynamic bandwidth limiters $322_1$-$322_Q$ may, for example, be implemented in storage application 106 or replica manager 116 (FIG. 1), or may be implemented in storage array 302.

As will be described, a given dynamic bandwidth limiter 322 may receive I/O requests for an associated cluster of storage array 302. Dynamic bandwidth limiter 322 may provide flow control for associated cluster(s) by preventing cluster overloading. For example, when a cluster is overloaded (e.g., processing too many concurrent I/O requests, or processing I/O request(s) that are too large), cluster instability, crashes, and degraded operation of storage system 100 may result. Flow control may be especially beneficial for clusters having strong time constraints, for example where latency of an I/O request must be less than a given latency threshold. However, system load level, and thus latency, strongly depends on a pattern of I/O requests. For example, a pattern of I/O requests having large read requests to a given cluster (e.g., requests to read large amounts of data from the cluster) mixed with small write requests to the same cluster (e.g., requests to write small amounts of data to the cluster) may overload the cluster, while other patterns of I/O requests that have the same overall data bandwidth may not overload the cluster. Flow control can become even more complex in distributed storage systems (e.g., as shown in FIG. 1) that may have multiple entry points (e.g., multiple devices, such as hosts 113, storage application 106, or replica manager 116, that may initiate an I/O request).

Described embodiments may employ dynamic bandwidth limiter 322 to provide autonomous and distributed flow control based upon average and/or peak latency. In some embodiments, the average and/or peak latency may be determined based upon an end-to-end feedback loop. In described embodiments, the end-to-end latency may be defined as an elapsed time for I/O requests to be completed by storage system 100. Some embodiments do not employ coordination or central management for flow control.

Described embodiments increase (and in a preferred embodiment may maximize) data throughput while maintaining latency of I/O requests below a configurable threshold. In some embodiments, a dynamic bandwidth limiter 322 associated with a given cluster 304. Each dynamic bandwidth limiter 322 prevents concurrent I/O requests for a cluster from exceeding a maximum value. For example, dynamic bandwidth limiter 322 may prevent more than a "choker size" amount of data from being processed concurrently for a cluster. For example, the choker size may be a threshold number of pages, sectors, or blocks, a threshold number of bytes, or a threshold number of I/O requests that may be processed concurrently for a given cluster.

In some embodiments, dynamic bandwidth limiter 322 may periodically update the choker size during operation of storage system 100. In some embodiments, the choker size parameter may be dynamically configurable during operation of storage system 100, for example based upon operating conditions of storage system 100 (or of one or more clusters of storage system 100). In some embodiments, each cluster may have an individually settable choker size value. In other embodiments, a choker size value may be associated with more than one cluster.

For example, dynamic bandwidth limiter 322 may update its associated choker size once per monitoring interval. In illustrative embodiments, a monitoring interval may be on the order of several seconds, for example, 5, 10, or 15 seconds. During each monitoring interval, an average end-to-end I/O latency and/or a peak end-to-end I/O latency may be determined. As described herein, in described embodiments, the end-to-end latency may be defined as an elapsed time for I/O requests to be completed by storage system 100. In some embodiments, the average and/or peak end-to-end latency may be determined for each cluster individually, for a group of two or more clusters, or for storage system 100 as a whole. At the end of each monitoring interval, dynamic bandwidth limiter 322 may update the choker size.

For example, if the average I/O latency during a given monitoring interval is below a configurable latency threshold, dynamic bandwidth limiter 322 may increase the choker size for an associated cluster. In other words, since the cluster had low latency, the choker size may be increased since additional I/O requests may be processed without exceeding the latency threshold. Similarly, average I/O latency during a given monitoring interval is above the configurable latency threshold, dynamic bandwidth limiter 322 may decrease the choker size for an associated cluster. In other words, since the cluster had high latency, the choker size may be decreased, such that fewer I/O requests may be processed and the I/O latency of the cluster may be reduced. Some embodiments may employ a single latency threshold, while other embodiments may employ multiple latency thresholds, for example a first threshold to determine whether to decrease the choker size (e.g., a high latency threshold), and a second threshold to determine whether to increase the choker size (e.g., a low latency threshold). For example, in an illustrative embodiment, the high latency threshold may be 1000 microseconds, and the low latency threshold may be 700 microseconds.

In some embodiments, the choker size may be adjusted within a limited range (e.g., between a minimum choker size and a maximum choker size), which may be based upon parameters of storage system 100. Some embodiments may adjust the choker size by predetermined adjustment steps. Some embodiments may provide hysteresis in the adjustment of the choker value by employing a first adjustment step for increasing the choker size, and a second adjustment step for decreasing the choker size. In an illustrative embodiment, the adjustment step for increasing the choker size may be smaller than the adjustment step for decreasing the choker size, for example to slowly increase the number of I/O requests that a cluster may concurrently process but quickly reduce the number of I/O requests that a cluster may concurrently process when the cluster is overloaded. For example, in an illustrative embodiment, the choker size may initially be set to 240 pages (e.g., 240 8 KB pages), and may have a range from a minimum choker size of 120 pages to a maximum choker size of 28672 pages. In an illustrative embodiment, the adjustment step size may be 20 pages.

In some embodiments, the sizes of the adjustment steps may be tuned based upon operating conditions of storage system 100. For example, dynamic bandwidth limiter 322 may adjust the adjustment steps to provide coarser (e.g., larger steps) adjustment of the choker size or finer (e.g., smaller steps) adjustment of the choker size, for example based upon how frequently the choker size has been updated.

Some embodiments may limit an amount the choker size may be adjusted in a given number of monitoring intervals, or may limit a number of times a given choker size may be adjusted in a given number of monitoring intervals.

Data (or I/O requests) in excess of the choker size for a given cluster may be either rejected or queued by the associated dynamic bandwidth limiter 322 until use of the cluster is below the choker size. To reduce sensitivity to traffic bursts, described embodiments of dynamic bandwidth limiter 322 may employ delayed rejection of excessive I/O requests. For example, dynamic bandwidth limiter 322 may queue a subsequent I/O request (e.g., in queue 324), and only reject a queued I/O request after a retention interval expires. For example, if a traffic burst causes numerous I/O requests in excess of the choker size, queued I/O requests may be able to be processed as the traffic burst subsides, and before the retention interval expires. However, in a system that is not experiencing bursty traffic, but instead is experiencing persistent overloading, queued I/O requests may be rejected as a retention interval expires for a given queued I/O request. In some embodiments, the retention interval may be set dynamically based upon operating conditions of storage system 100. In some embodiments, the retention interval may be set by a user of storage system 100. In an illustrative embodiment, the retention interval may be set in the range of several seconds. For example, the retention interval may be 3 seconds.

Figure 4:
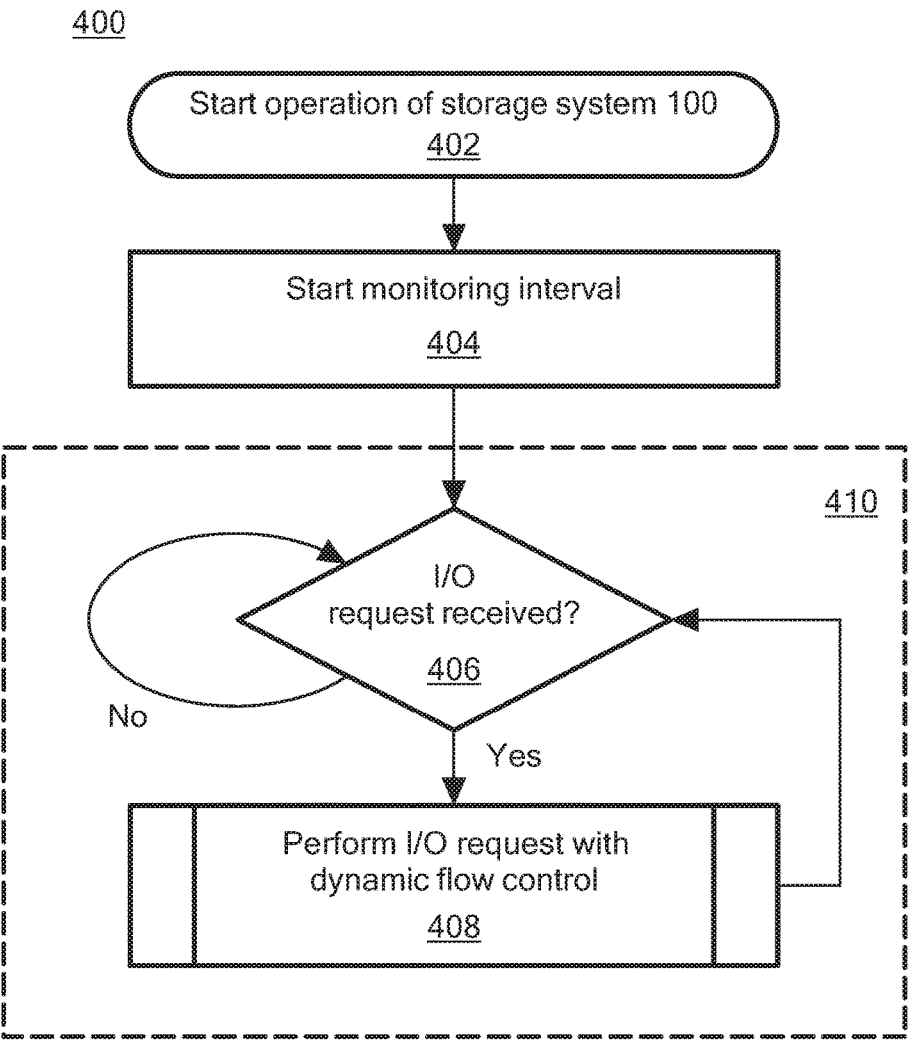
FIG. 4 is a flow diagram of an example of a process to operate a storage media in accordance with an illustrative embodiment.

FIG. 4 shows a flow diagram of an illustrative process 400 for operating storage system 100. At block 402, process 400 starts, for example when storage system 100 is powered on. At block 404, described embodiments may start a monitoring interval to monitor latency of I/O requests during the interval. At block 406, if storage system 100 receives an I/O request (e.g., I/O request 151 of FIG. 1), then at block 408, storage system 100 performs the I/O request with dynamic flow control. Block 408 will be described in greater detail in regard to FIG. 5. Process 406 may then return to block 406 to receive additional I/O requests. Process 400 may generally run until storage system 100 is powered off. Although shown in FIG. 4 as being a sequential operation, storage system 100 may receive (e.g., block 406) and process (e.g., block 408) multiple I/O requests concurrently, for example as indicated by dashed line 410.

Figure 5:
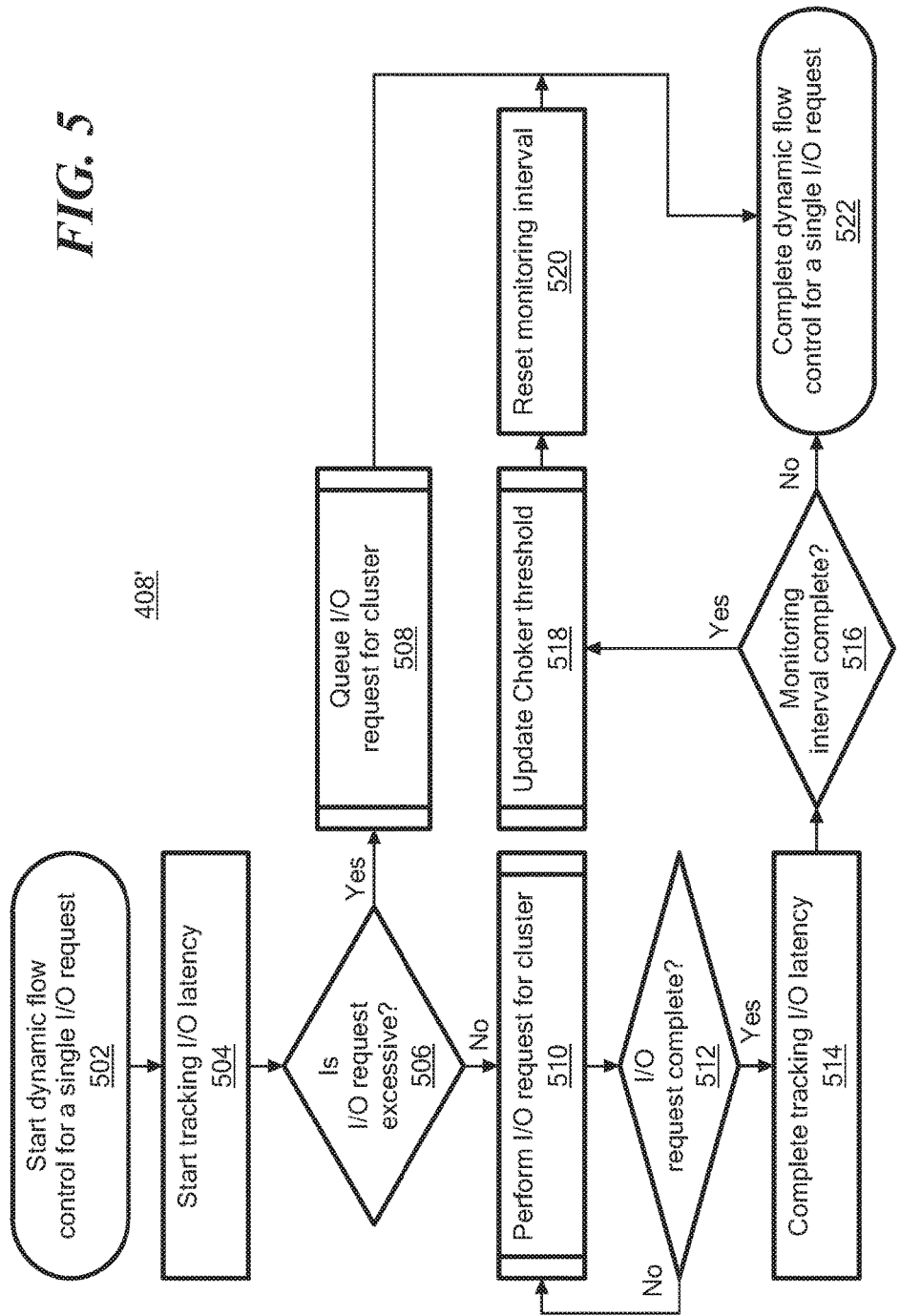
FIG. 5 is a flow diagram of an example of a process to perform an input/output (I/O) operation of a storage system in accordance with an illustrative embodiment.

FIG. 5 shows additional detail of block 408 of FIG. 4, shown as process 408'. As shown in FIG. 5, storage system 100 starts performing the I/O request with dynamic flow control at block 502. Process 408' may be performed for a single I/O request, or performed for multiple I/O requests concurrently. At block 504, storage system 100 (for example via dynamic bandwidth limiter 322 of FIG. 3B) may start tracking latency of a current I/O request. At block 506, a dynamic bandwidth limiter 322 that is associated with the cluster of the I/O request determines whether the I/O request should be processed for the cluster. For example, in some embodiments, dynamic bandwidth limiter 322 may determine whether the I/O request is excessive for the cluster. For example, as described herein, dynamic bandwidth limiter 322 may determine that a number of concurrent I/O requests for the cluster is above a threshold, or that a number of bytes (or pages) of concurrent I/O requests for the cluster is above a threshold.

If, at block 506, the I/O request is excessive, then at block 508, dynamic bandwidth limiter 322 may queue the I/O request in queue 324. Block 508 is described in greater detail in regard to FIG. 6. If, at block 506, the I/O request is not excessive, then at block 510, dynamic bandwidth limiter 322 may allow storage system 100 to process the I/O request in queue 324. For example, an I/O request may be performed at block 510 by reading requested data from a requested location in a cluster 304, or by writing associated user data to a location in a cluster 304. At block 512, as I/O requests are completed, then at block 514, storage system 100 may complete tracking latency for the completed I/O request.

At block 516, if the monitoring interval is complete, then at block 518, dynamic bandwidth limiter 322 may update an associated choker threshold. Block 518 is described in greater detail in regard to FIG. 7. At block 520, the monitoring interval is reset to monitor I/O requests for a subsequent interval. Process 408' continues to block 522. If, at block 516, the monitoring interval is not complete, the at block 522, process 408' completes, and storage system 100 continues processing other I/O requests as shown in FIG. 4.

Figure 6:
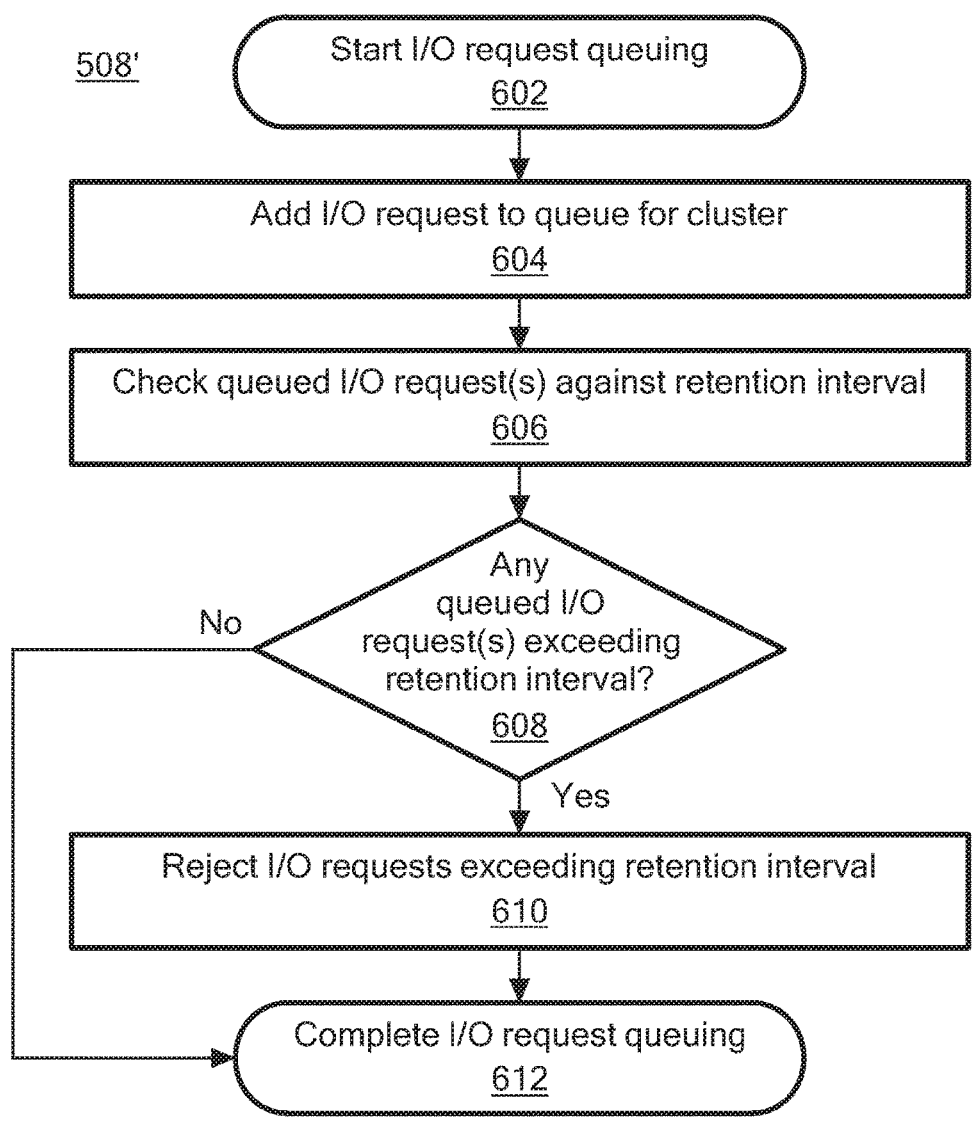
FIG. 6 is a flow diagram of an example of a process to queue I/O requests of a storage system in accordance with an illustrative embodiment.

FIG. 6 shows additional detail of block 508 of FIG. 5, shown as process 508'. As shown in FIG. 6, dynamic bandwidth limiter 322 may start queuing an I/O request at block 602. At block 604, dynamic bandwidth limiter 322 may add the I/O request to a queue 324 associated with the cluster of the I/O request. At block 606, dynamic bandwidth limiter 322 may check any queued I/O requests against a retention interval associated with the cluster.

If, at block 608, any of the queued I/O requests exceed the retention interval, then at block 610, the I/O request(s) exceeding the retention interval may be rejected. For example, each queued I/O request may be stored in queue 324 with a time stamp, and if a difference between a current time and the time stamp value reaches or exceeds the retention interval, then at block 610, dynamic bandwidth limiter 322 may reject the I/O request. Process 508' continues to block 612. If, at block 608, none of the queued I/O requests have reached or exceeded the retention interval, then at block 612, process 508' completes.

Figure 7:
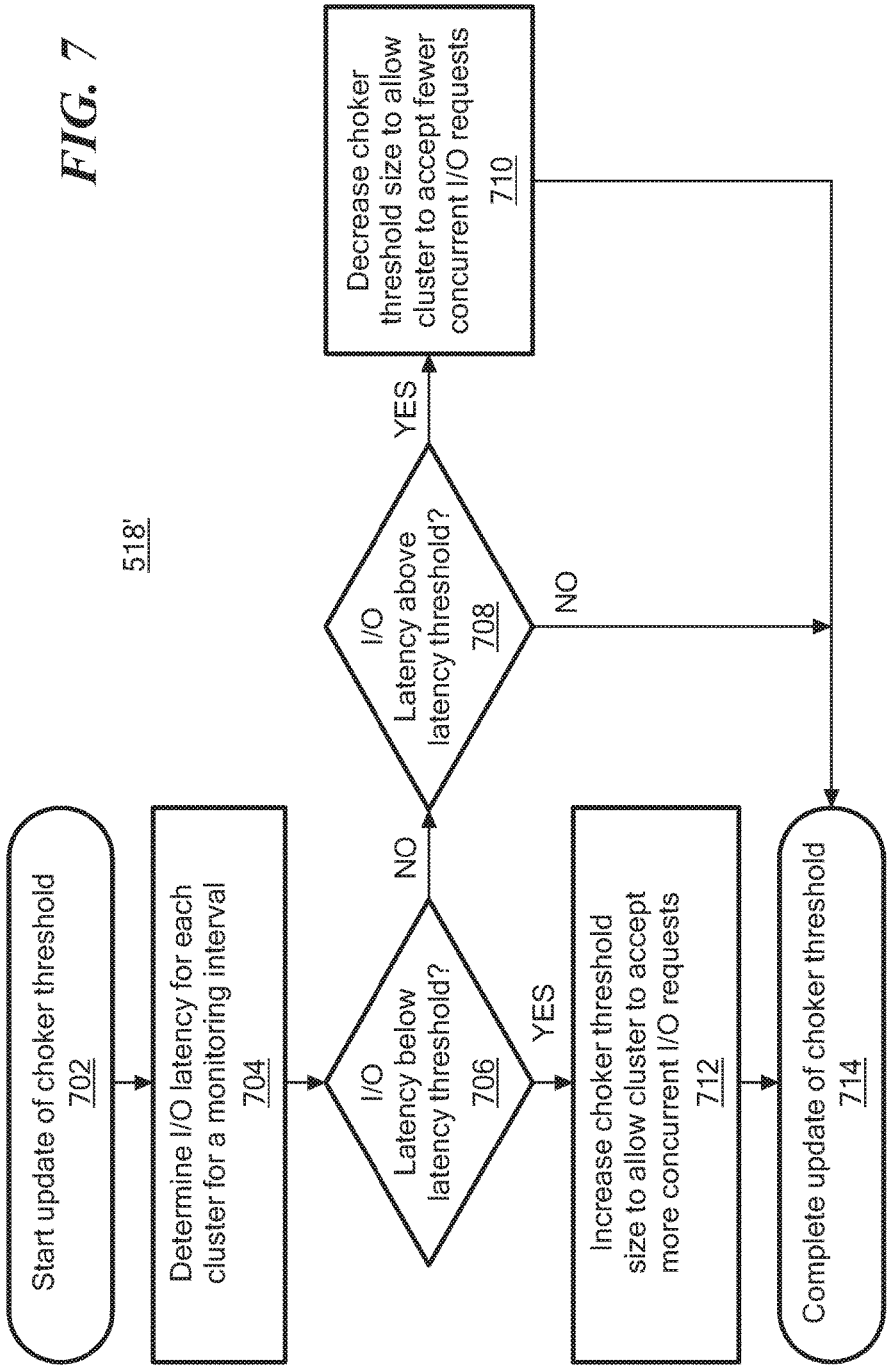
FIG. 7 is a flow diagram of an example of a process to update a flow control choker threshold of a storage system in accordance with an illustrative embodiment.

FIG. 7 shows additional detail of block 518 of FIG. 5, shown as process 518'. As shown in FIG. 7, dynamic bandwidth limiter 322 may start updating an associated choker threshold at block 702. At block 704, storage system 100 (for example via dynamic bandwidth limiter 322 of FIG. 3B) may determine an I/O latency for each cluster 304 over a monitoring interval. For example, storage system 100 may determine an average latency value for one or more I/O requests processed during the monitoring interval, and/or may determine a peak latency value for one or more I/O requests processed during the monitoring interval.

At block 706, if the determined I/O latency (e.g., the peak latency and/or average latency) for the monitoring interval is at or below the choker threshold, then at block 712, dynamic bandwidth limiter 322 may increase the choker threshold to allow the associated cluster 304 to accept additional concurrent I/O requests, and/or larger concurrent I/O requests. Process 518' continues to block 714. If, at block 706, if the determined I/O latency (e.g., the peak latency and/or average latency) for the monitoring interval is not below the choker threshold, then at block 708, dynamic bandwidth limiter 322 may determine whether the determined I/O latency (e.g., the peak latency and/or average latency) for the monitoring interval is above the choker threshold.

If, at block 708, the determined I/O latency (e.g., the peak latency and/or average latency) for the monitoring interval is above the choker threshold, then at block 710, dynamic bandwidth limiter 322 may decrease the choker threshold to reduce the number of concurrent I/O requests, and/or the size of concurrent I/O requests, that the associated cluster 304 may accept. Process 518' continues to block 714. If, at block 708, the determined I/O latency (e.g., the peak latency and/or average latency) for the monitoring interval is not above the choker threshold, then process 518' continues to block 714. At block 714, process 518' may complete.

As described, in some embodiments, dynamic bandwidth limiter 322 may employ a single latency threshold, while other embodiments may employ multiple latency thresholds, for example a first threshold to determine whether to decrease the choker size (e.g., a high latency threshold), and a second threshold to determine whether to increase the choker size (e.g., a low latency threshold).

As described, at blocks 710 and 712, dynamic bandwidth limiter 322 may decrease or increase, respectively, the choker threshold by predetermined adjustment steps. Some embodiments may provide hysteresis in the adjustment of the choker value by employing a first adjustment step for increasing the choker size, and a second adjustment step for decreasing the choker size. In an illustrative embodiment, the adjustment step for increasing the choker size may be smaller than the adjustment step for decreasing the choker size, for example to slowly increase the number of I/O requests that a cluster may concurrently process but quickly reduce the number of I/O requests that a cluster may concurrently process when the cluster is overloaded.

Figure 8:
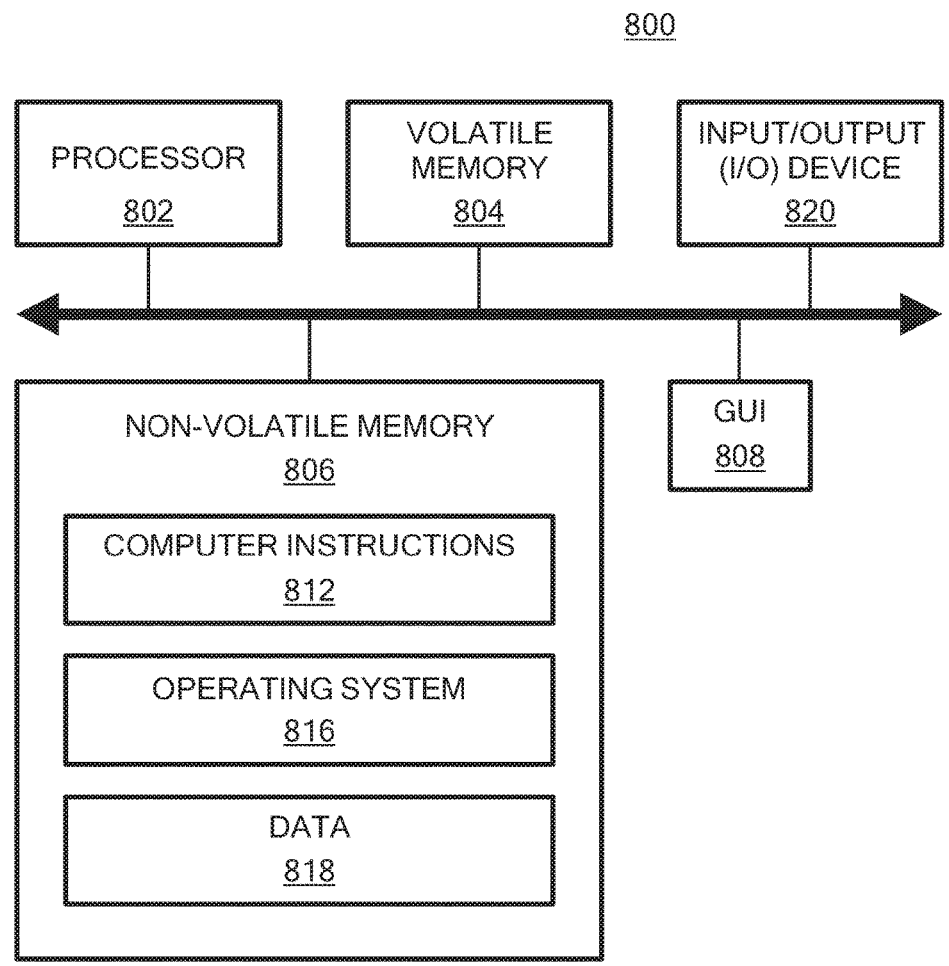
FIG. 8 is a block diagram of an example of a hardware device that may perform at least a portion of the processes in FIGS. 4-7.

Referring to FIG. 8, in some embodiments, source site 102 and/or target site 112 may be implemented as one or more computers. Computer 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of processes 400, 408', 508', and 518' (FIGS. 4-7). Program code may be applied to data entered using an input device of GUI 808 or received from I/O device 820.

Processes 400, 408', 508', and 518' (FIGS. 4-7) are not limited to use with the hardware and software of FIG. 8 and may find applicability in any computing or processing environment and with any type of machine or set of machines that may be capable of running a computer program. Processes 400, 408', 508', and 518' (FIGS. 4-7) may be implemented in hardware, software, or a combination of the two.

The processes described herein are not limited to the specific embodiments described. For example, processes 400, 408', 508', and 518' are not limited to the specific processing order shown in FIGS. 4-7. Rather, any of the blocks of processes 400, 408', 508', and 518' may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:
1. A method comprising:
receiving one or more input/output (I/O) requests by a storage system having at least one storage cluster, each of the received I/O requests associated with a storage cluster;
performing the I/O request with dynamic flow control by:
determining a latency associated with the one or more received I/O requests during at least one monitoring interval;
tracking I/O requests to the storage cluster;
if a received I/O request exceeds a choker threshold value of the storage cluster, queuing the received I/O request, otherwise, performing the received I/O request,
wherein determining the latency associated with the one or more received I/O requests during at least one monitoring interval comprises:
determining an end-to-end latency of each of the one or more received I/O requests performed for the storage cluster during the monitoring interval; and
determining latency for the storage cluster as at least one of: a peak latency for the storage cluster during the monitoring interval, and an average latency for the storage cluster during the monitoring interval; and
based upon the determined latency for the storage cluster, adjusting the choker threshold value associated with the storage cluster, wherein adjusting the choker threshold value comprises:
if the determined latency for the storage cluster is below a first latency threshold value, increasing the choker threshold value by a first step value; and
if the determined latency for the storage cluster is above a second latency threshold value, decreasing the choker threshold value by a second step value,
wherein the choker threshold value of the storage cluster comprises one of: a maximum number of concurrent I/O requests that can be processed by the storage cluster, and a maximum amount of data that can be processed by the storage cluster.

2. The method of claim 1, wherein the first latency threshold value and the second latency threshold value comprise the same value.

3. The method of claim 2, wherein the second step value is larger than the first step value.

4. The method of claim 1, wherein queuing the received I/O request comprises:
adding the received I/O request to a queue corresponding to the storage cluster associated with the I/O request; and
rejecting any queued I/O requests that have reached a retention interval value associated with the storage cluster.

5. The method of claim 1, further comprising, based upon one or more operating conditions of the storage system, adjusting the retention interval value.

6. A system comprising:
a processor; and
memory storing computer program code that when executed on the processor causes the processor to execute an input/output (I/O) request received by a storage system having at least one storage cluster operable to perform the operations of:
performing the I/O request with dynamic flow control by:
determining a latency associated with the one or more received I/O requests during at least one monitoring interval;
tracking I/O requests to the storage cluster; and
if a received I/O request exceeds a choker threshold value of the storage cluster, queuing the received I/O request, otherwise, performing the received I/O request, wherein determining the latency associated with the one or more received I/O requests during at least one monitoring interval comprises:
determining an end-to-end latency of each of the one or more received I/O requests performed for the storage cluster during the monitoring interval; and
determining latency for the storage cluster as at least one of: a peak latency for the storage cluster during the monitoring interval, and an average latency for the storage cluster during the monitoring interval; and
based upon the determined latency for the storage cluster, adjusting the choker threshold value associated with the storage cluster, wherein adjusting the choker threshold value comprises:
if the determined latency for the storage cluster is below a first latency threshold value, increasing the choker threshold value by a first step value; and
if the determined latency for the storage cluster is above a second latency threshold value, decreasing the choker threshold value by a second step value, wherein the choker threshold value of the storage cluster comprises one of: a maximum number of concurrent I/O requests that can be processed by the storage cluster, and a maximum amount of data that can be processed by the storage cluster.

7. The system of claim 6, wherein the first latency threshold value and the second latency threshold value comprise the same value.

8. The system of claim 6, wherein the second step value is larger than the first step value.

9. The system of claim 6, wherein the system is further operable to perform the operations of:
adding the received I/O request to a queue corresponding to the storage cluster;
rejecting any queued I/O requests that have reached a retention interval value associated with the storage cluster; and
based upon one or more operating conditions of the storage system, adjusting the retention interval value.

10. A computer program product including a non-transitory computer readable storage medium having computer program code encoded thereon that when executed on a processor of a computer causes the computer to execute an input/output (I/O) request received by a storage system having at least one storage cluster, the computer program product comprising:
computer program code for receiving one or more input/output (I/O) requests; and
computer program code for performing the I/O request with dynamic flow control by:
determining a latency associated with the one or more received I/O requests during at least one monitoring interval;
tracking I/O requests to the storage cluster; and
if a received I/O request exceeds a choker threshold value of the storage cluster, queuing the received I/O request, otherwise, performing the received I/O request, wherein determining the latency associated with the one or more received I/O requests during at least one monitoring interval comprises:

determining an end-to-end latency of each of the one or more received I/O requests performed for the storage cluster during the monitoring interval; and determining latency for the storage cluster as at least one of: a peak latency for the storage cluster during the monitoring interval, and an average latency for the storage cluster during the monitoring interval; and based upon the determined latency for the storage cluster, adjusting the choker threshold value associated with the storage cluster, wherein adjusting the choker threshold value comprises:

if the determined latency for the storage cluster is below a first latency threshold value, increasing the choker threshold value by a first step value; and if the determined latency for the storage cluster is above a second latency threshold value, decreasing the choker threshold value by a second step value, wherein the choker threshold value of a storage cluster comprises one of: a maximum number of concurrent I/O requests that can be processed by the storage cluster, and a maximum amount of data that can be processed by the storage cluster.

11. The computer program product of claim 10, further comprising:

computer program code for adding the received I/O request to a queue corresponding to the storage cluster;

computer program code for rejecting any queued I/O requests that have reached a retention interval value associated with the storage cluster; and computer program code for adjusting the retention interval value based upon one or more operating conditions of the storage system.

\* \* \* \* \*